US010037627B2

(12) United States Patent
Hustad et al.

(10) Patent No.: US 10,037,627 B2
(45) Date of Patent: Jul. 31, 2018

(54) AUGMENTED VISUALIZATION SYSTEM FOR HIDDEN STRUCTURES

(71) Applicant: Argis Technologies, LLC, Aurora, CO (US)

(72) Inventors: Brady Hustad, Aurora, CO (US); Dolphus James Derry, III, Forney, TX (US); Christopher Anderson, Humble, TX (US); Alex Yrigoyen, Houston, TX (US); Kevin Criss, Crosby, TX (US); Jerre Teague, Vancouver, WA (US)

(73) Assignee: Argis Technologies LLC, Aurora, CO (US)

( * ) Notice: Subject to any disclaimer, the term of this patent is extended or adjusted under 35 U.S.C. 154(b) by 0 days.

(21) Appl. No.: 15/235,334

(22) Filed: Aug. 12, 2016

(65) Prior Publication Data

US 2017/0046877 A1 Feb. 16, 2017

Related U.S. Application Data

(60) Provisional application No. 62/205,421, filed on Aug. 14, 2015.

(51) Int. Cl.
*G06T 19/00* (2011.01)
*G06F 3/0346* (2013.01)
(Continued)

(52) U.S. Cl.
CPC .......... *G06T 19/006* (2013.01); *G06F 3/0346* (2013.01); *G06F 3/147* (2013.01);
(Continued)

(58) Field of Classification Search
None
See application file for complete search history.

(56) References Cited

U.S. PATENT DOCUMENTS 8,902,254 B1 * 12/2014 Laughlin ............... G06T 19/006
345/633
9,488,488 B2 11/2016 Waldman
(Continued)

OTHER PUBLICATIONS

Roberts, Gethin W., et al. "The use of augmented reality, GPS and INS for subsurface data visualization." FIG XXII International Congress. 2002.*
(Continued)

*Primary Examiner* — Ryan M Gray
(74) *Attorney, Agent, or Firm* — Gardner Linn

(57) ABSTRACT

An augmented visualization system includes a camera operable to capture a base image of a field of view. A spatial sensor is configured to sense a position of the camera and to generate positional information corresponding to the position. A controller is in communication with the camera, the spatial sensor, and a data source having stored geospatial data. The controller is configured to determine when the geospatial data corresponds to a location in the field of view of the camera based on the positional information. The controller is also configured to generate a geospatial image in response to the controller determining that the location corresponding to the geospatial data is in the field of view. A display is in communication with the controller and is operable to display a composite image in which the geospatial image is overlaid with the base image.

16 Claims, 6 Drawing Sheets

(51) Int. Cl.
*G09G 5/00* (2006.01)
*G06F 3/147* (2006.01)

(52) U.S. Cl.
CPC ......... *G09G 5/003* (2013.01); *G09G 2340/10* (2013.01); *G09G 2340/12* (2013.01); *G09G 2340/14* (2013.01)

(56) References Cited

U.S. PATENT DOCUMENTS

| | | | | |
|---|---|---|---|---|
| 9,524,585 | B2* | 12/2016 | Steed | G06T 15/50 |
| 2012/0127161 | A1* | 5/2012 | Wallbom | G06T 19/006 |
| | | | | 345/419 |
| 2014/0210856 | A1* | 7/2014 | Finn | G01C 15/002 |
| | | | | 345/633 |

OTHER PUBLICATIONS

Schall, Gerhard, et al. "Handheld augmented reality for underground infrastructure visualization." Personal and ubiquitous computing 13.4 (2009): 281-291.*

Augview Limited, Augview Augmented Technology UAE, presentation slides, Apr. 2015, pp. 1-25.

Mike Bundock, Augview Limited, ESRI NZ User Group, Use of ArcGIS Server to support Augmented Reality Mobile Applications, presentation slides, 2013, pp. 1-10.

Mike Bundock, Augview Limited, Augview Augmented Technology, presentation slides, May 2013, pp. 1-22.

Augview Limited, ESRI NZ User Group, An Analysis of Mobile Device Sensors—GPS, digital compass and accelerometer accuracy, presentation slides, 2013, pp. 1-35.

Augview Augmented Technology, Empowering Your Field Staff, fact sheet, 2013, pp. 1-2.

Mike Bundock, Augview Limited, LAKU—Malaysian Water Authority using AUGVIEW mobile GIS with Augmented Reality, presentation slides, Mar. 2014, pp. 1-25.

Mike Bundock, Augview Limited, Incorporating Augmented Reality into Field Systems, presentation slides, Nov. 2013, pp. 1-25.

Mike Bundock, Augview Limited, Using Augmented Reality to Reduce the Health and Safety Risks of Managing Assets, presentation slides, 2014 NZ Gas Industry Forum, 2014, pp. 1-28.

Augview Limited, Smallworld User Group, An Analysis of Mobile Device Sensors—GPS, digital compass and accelerometer accuracy, presentation slides, 2013, pp. 1-36.

Augview Limited, Smallworld User Group, Use of Smallworld GSS to Facilitate Small quick-to-deploy Apps—Using GSS as a Server for Mobile Apps, presentation slides, 2013, pp. 1-27.

Augview Limited, Using Augmented Reality to strengthen asset management and H&S for field crews, GITA Webinar slides, Apr. 2015, pp. 1-27.

Augview Limited, HKTDC Hong Kong, presentation slides, Apr. 2015, pp. 1-20.

Augview Limited, RIMS Forum Auckland, presentation slides, Mar. 2015, pp. 1-24.

Augview Augmented Technology, Augview offers, flyer.

Flooding images, Jun. 2015.

Augview Limited, Augmented Reality Mobile GIS, website, 2013, <www.augview.net>.

Hatem Taha, Middle East Geospatial Forum 2015 Conference Recap, presentation slides, Feb. 2015, pp. 1-11.

* cited by examiner

US 10,037,627 B2

AUGMENTED VISUALIZATION SYSTEM FOR HIDDEN STRUCTURES

CROSS REFERENCE TO RELATED APPLICATION

The present application claims the benefit of U.S. provisional application Ser. No. 62/205,421, filed Aug. 14, 2015, which is hereby incorporated by reference in its entirety.

FIELD OF THE INVENTION

The present invention generally relates to the field of data visualization systems, and more particularly to virtual and augmented reality systems that incorporate complex data visualization for displaying objects and information over or in video images or otherwise in a user's line of sight.

BACKGROUND OF THE INVENTION

Recently, the concepts of virtual reality and augmented reality (AR) have gained more attention, as technology has started to allow pioneers to experiment in developing these concepts that were previously the subject of science fiction. This rise in popularity has come into being largely with the advancement of mobile and wearable devices powerful enough to process complex information, to intuitively interact with a user, and to display the processed information in unique and useful ways. These developments have resulted in hardware solutions for augmented reality concepts, along with advances that provide applications of augmented reality.

SUMMARY OF THE INVENTION

The present invention provides an augmented visualization system that includes a camera, a spatial sensor, and a display that displays an image generated by a controller, which processes geospatial data associated with the positional information of the camera, including its location and directional field of the view. The system generates a geospatial image that is displayed over or imbedded in the base image that is captured by the camera, in a manner that anchors to reality through geographical positioning, thereby providing a geographically relevant composite image to a user of the augmented reality system. The augmented reality system provides a three-dimensional model of real time and/or stored spatial data viewable on mobile devices, wearable devices, or other viewing platforms. The geospatial images can be applied for finding underground and/or hidden structures and assets, team member locations, environmental visualization and the like for use in a variety of applications, including the oil, gas, energy and utility industries, by governmental agencies, emergency and/or disaster response entities, and the like. Accordingly, the geospatial images and user interaction therewith can be customized for the specific application and user's rendering device and other viewing platforms.

Optionally, the display may be positioned between the camera and the user, such that the geospatial image is displayed in-line with the user's vision field to easily associate the geospatial image with the location of the user. Also, the display may optionally include a touch screen that is configured to receive a touch event, such that when the touch event is directed over a geospatial icon, an informational element may be generated and displayed to provide information corresponding to the associated geospatial data.

Optionally, the controller may be configured to process the base image for determining elevation of an object or the landscape or the like in the base image, whereby the geospatial image may be sized and/or positioned relative to the based image based on the determined elevation of the object in the base image.

The geospatial image may, optionally, include a hidden structure not visible in the base image, such as an underground utility line, a usage meter, and a septic tank.

These and other aspects, objects, and features of the present invention will be understood and appreciated by those skilled in the art upon studying the following specification, claims, and appended drawings.

DESCRIPTION OF THE PREFERRED EMBODIMENTS

Figure 1:
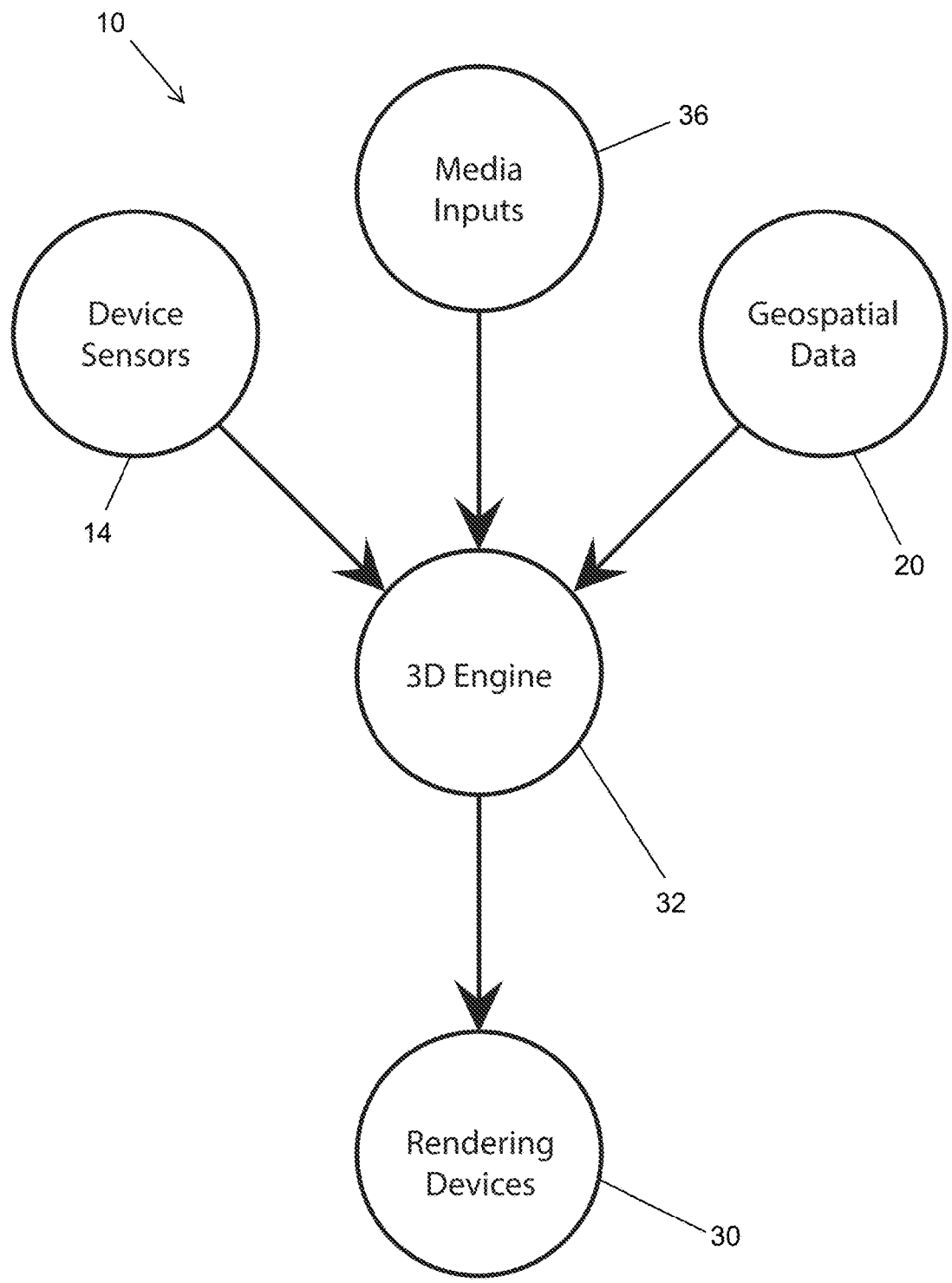
FIG. 1 is a schematic flow chart of an augmented visualization system, in accordance with the present invention.

Referring now to the drawings and the illustrative embodiments depicted therein, a augmented visualization system 10 includes a camera 12, a spatial sensor 14, and a display 16 that displays an image generated by a controller 18 processing geospatial data 20 that is associated with the positional information of the camera 12, including its geographic location and directional field of the view 22. The system 10 generates a geospatial image 24 that is displayed over or imbedded in a base image 26 that is captured by the camera 12 to provide a composite image to a user of the augmented reality system. As shown, the display 16 is positioned in-line with the user's vision field 28 to easily associate the geospatial image 24 with the location of the user. The augmented reality system 10 provides a three-dimensional model of real time and/or stored spatial data viewable on mobile devices, wearable devices, or other viewing platforms. The geospatial images 24 can be applied for finding underground and/or hidden structures and assets, team member locations, environmental visualization and the like for use in a variety of applications, including the oil, gas, energy and utility industries, by governmental agencies, emergency and/or disaster response entities, and the like. Accordingly, the geospatial images 24 and user interaction therewith can be customized for the specific application and user's rendering device and other viewing platforms.

The augmented reality system 10 framework locates and tracks its user's motion, creates a three-dimensional model of the geospatial data around them, and then layers available statistics, information, and data onto the image. Viewed through a mobile device camera or augmented reality glasses, the user can view not only their real-time environment but the hidden and unseen structures or objects as well, and then use the customizable application to execute a work order, perform maintenance, locate critical assets, or identify needed information. With location-based data, the augmented reality system 10 integrates AG as a new, scalable, and customizable visualization to data. In real time and with real-world context, a user can see what they need to execute tasks without wasting time, resources, or efforts. To improve connectivity, the data source may accessible via wireless communication, such as LAN, cellular, satellite, Bluetooth, and the like. The augmented visualization system 10 framework takes, for example, cloud-based spatial data from any dataset and renders the relevant geo-located GIS data points as fully customizable lines, vectors and polygons. It may display the information as an overlay to the real world as viewed through cameras on mobile devices, such as tablets, wearables, or AR devices.

Spatial sensors 14, such as location and positional sensors commonly provided in a rendering device 30, such as a mobile device or wearable device, are included in the augmented visualization system 10 to dynamically anchor the location of the camera 12 and/or user and identify the direction the user and/or camera 12 is facing, such as the general direction of the user's vision field 28 and the camera's field of the view 22. This allows the augmented visualization system 10 of the present invention to be used without being near markers or recognized objects. To provide a generally accurate elevational depiction of geospatial images 24 with respect to the base image 26, a dynamic elevation algorithm is used with depth sensor technology to accurately display data within the elevation surrounding the user. Also, to provide a visualization of useful and customizable data to a user through the augmented visualization system 10, the controller 18 is configured to receive and process existing spatial data, such as user information 20*d*, as well as spatial data input into or generated by operating the augmented visualization system 10, so that users can use geospatial data 20 already compiled have for visualization with the augmented visualization system 10 of the present invention. For example, the augmented visualization system 10 may integrate symbology from the original spatial data to allow the user information 20*d* to be more effectively integrated into and processed by the controller 18.

More specifically, to convert Geospatial symbology to Unity GameObjects, symbology may be obtained by sending a Rest call to obtain the FeatureServiceLayerInfo as a json response (this will include the DrawingInfo). Then parsing the DrawingInfo into classes so the individual symbol (or symbols in the case of UniqueValue) can be accessed. The symbology classes mimic the ArcGIS Runtime SDK for .NET. The symbol class may have two properties to fill the needs of Unity, such as Unity Texture2D and Unity Sprite. With respect to obtaining the corresponding geometry, for example, a Query REST call may be sent to obtain a FeatureSet (also json) of features to place in Unity scene. The returned FeatureSet may then be parsed into Feature classes. The Feature classes mimic the ArcGIS Runtime SDK for .NET. One of the properties of the Feature class is the Geometry Property. The geometry may then be parsed into Geometry classes, which mimic ArcGIS Runtime SDK for .NET. Some differences are: the Geometry abstract class contains a virtual methods which return the geometry as a Unity Mesh; Polyline is a dynamically created (continuous) pipe mesh; TriangleNET and Clipper may be used to create the polygon mesh; both code bases may be edited to fit the NET 2.0 framework; and both code bases may be edited to work in the designed SDK, thereby merging Unity, TriangleNET, Clipper, Esri (and other Geospatial platforms), and my SDK to work together.

Figure 2:
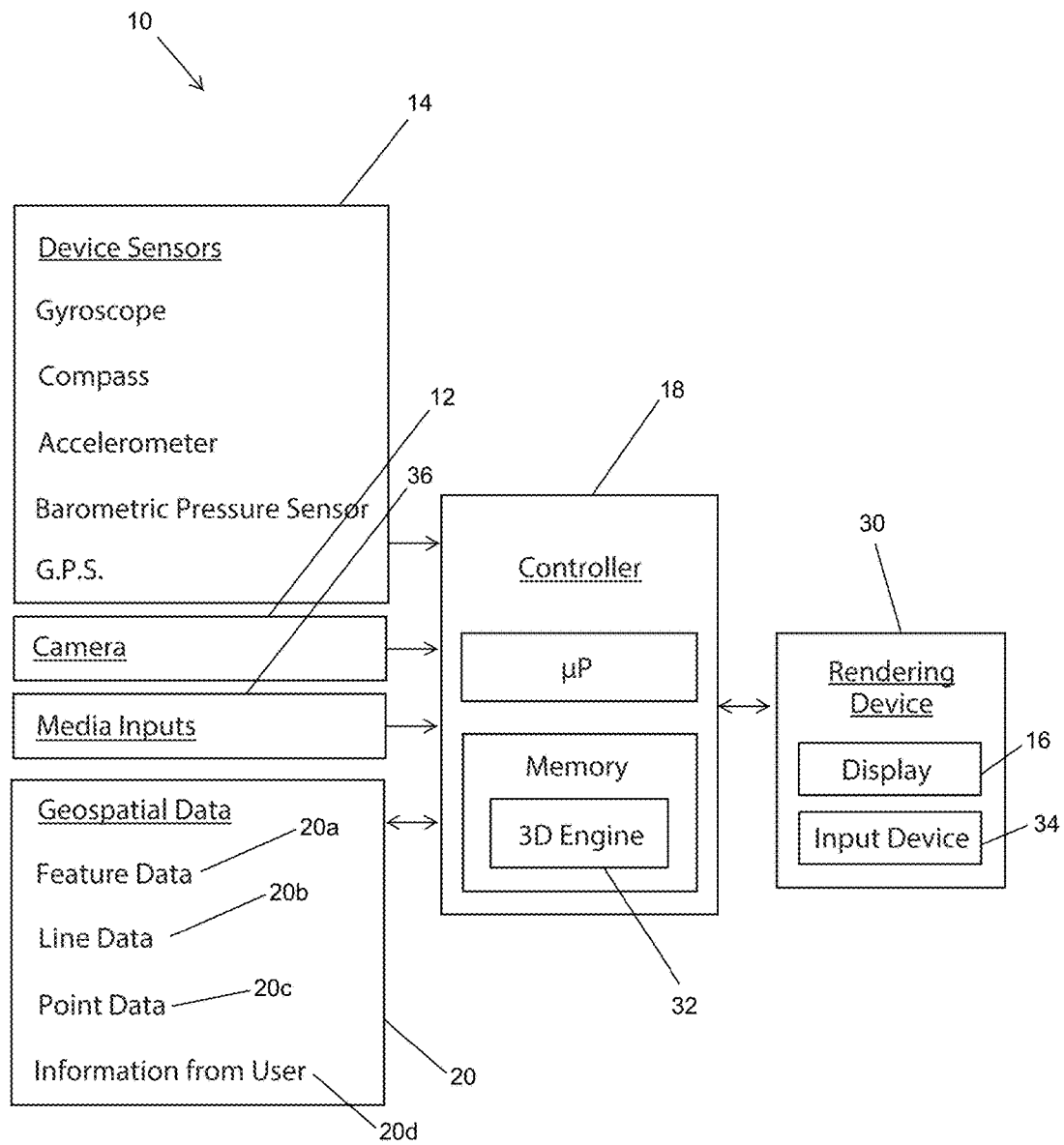
FIG. 2 is a control system diagram of the of the augmented visualization system.

As shown in FIG. 2, the controller 18 of the augmented visualization system 10 may include a microprocessor and/or other analog and/or digital circuitry for processing one or more routines or algorithms to create a smooth, accurate spatially anchored, or 'outside' augmented reality. Additionally, the controller 18 may include memory for storing one or more routines or algorithms, including a 3D engine software framework 32, for example Unity. It should be appreciated that the controller 18 may be a standalone dedicated controller, multiple separate controllers, or may be a shared controller integrated with other control functions, such as integrated with the rendering device 30, such as a tablet, to process the geospatial data 20, video images from the camera 12, output from device sensors 14, user inputs, and other inputs and perform related functionality. The controller 18 may process and implement advanced smoothing and filtering techniques to improve the motion and accuracy of the data visualization functionality of the augmented visualization system 10, such as utilizing individual or an aggregation of any of the following examples: Unity 3D gaming platform, Kalman filtering, Dynamic depth analysis, Simultaneous Location and Mapping (SLAM) to create dynamic elevation, Esri ArcGIS Online, MapBox, GPS, Gyroscopes, Gravimeter, Bluetooth technologies, and other geospatial platform technologies.

Figure 5:
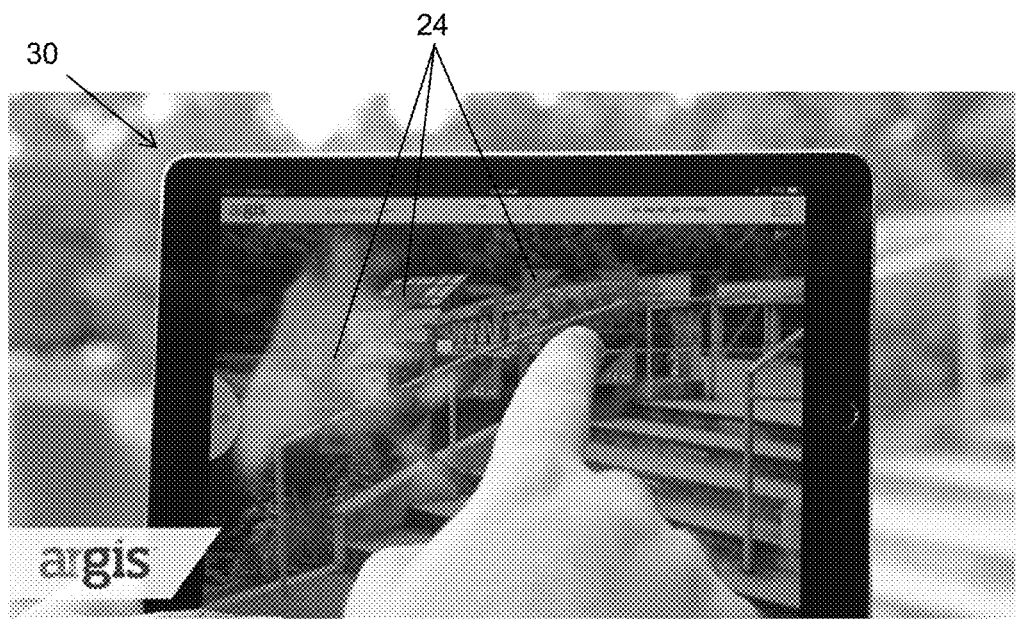
FIG. 5 is an elevational view of the display screen of the device, displaying three geospatial icons over the base image, with the user providing a touch event over one of the icons on the display screen.
Figure 6:
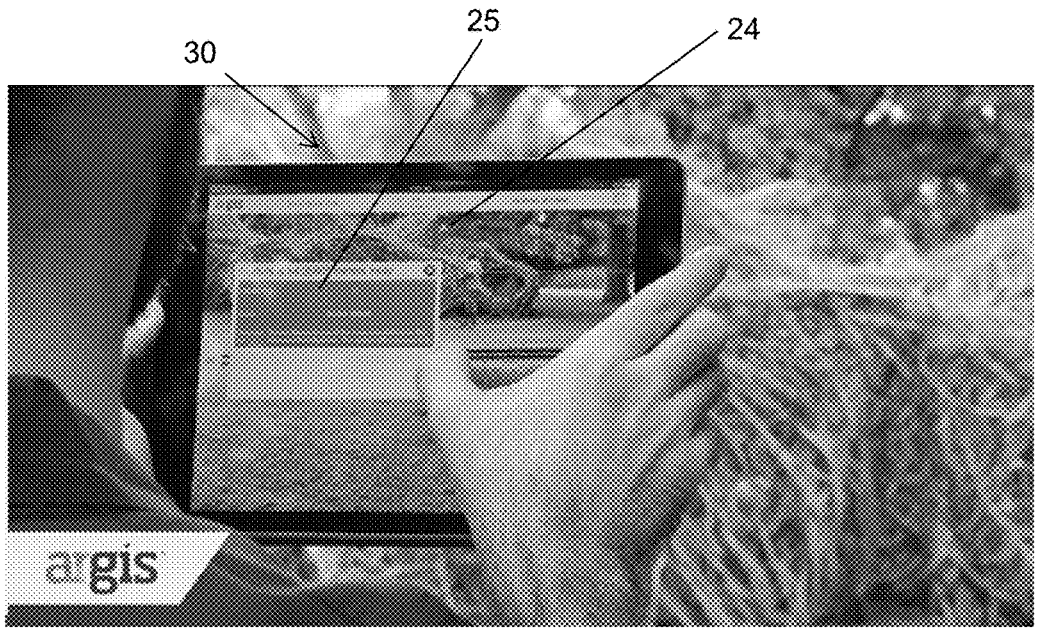
FIG. 6 is an elevational view of the display screen of the device, displaying an informational element associated with the geospatial icon displayed over the base image and the geospatial icon, with the user providing a touch event on the display screen to interact with the informational element.
Figure 7:
FIG. 7 is a composite image displayed by the display screen of the device, including a geospatial icons, road data, and property line data over a base image.
Figure 8:
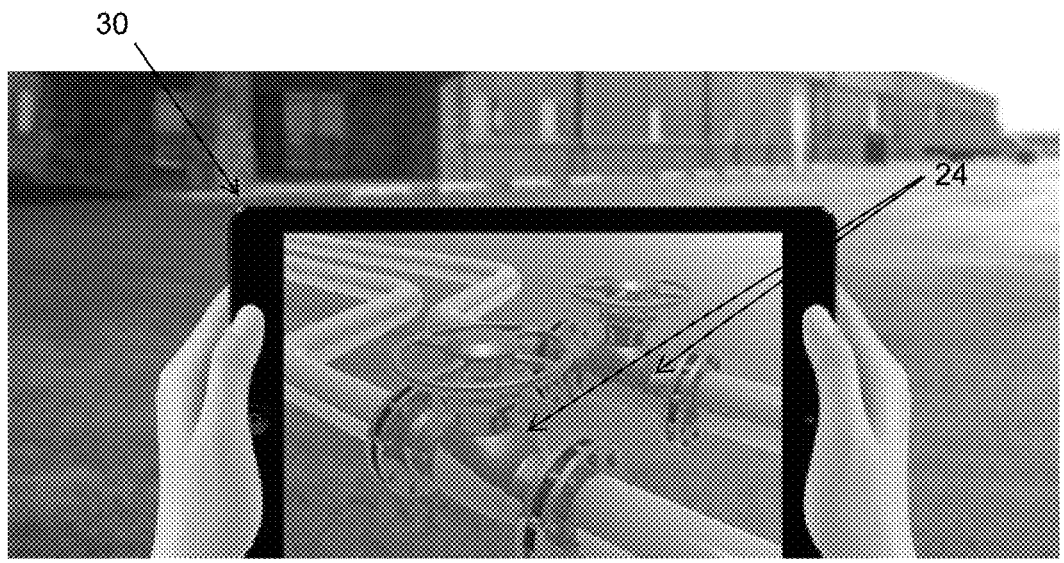
FIG. 8 is an elevational view of the display screen of the device, displaying an a geospatial image of a utility line over a base image.
Figure 9:
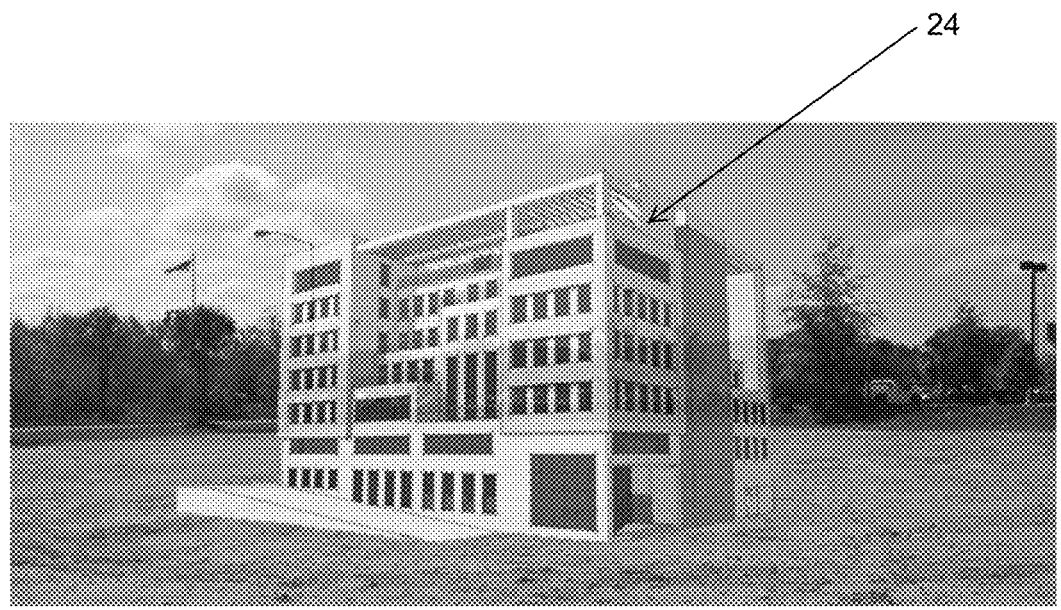
FIG. 9 is a composite image displayed by the display screen of the device, including a geospatial image of a three-dimensional architectural rendering over a base image.

With respect to the various potential inputs to the augmented visualization system 10, as also shown in FIG. 2, the controller 18 may receive input from an input device 34. This input device 34 may include an input on the rendering device 30, such as a touch screen of the display 16 on a tablet as shown in FIG. 5, a camera or motion sensor for gesture commands, a microphone for voice commands, a keyboard, a mouse, a joystick, a button pad, or other conceivable input devices for a user to interact with the augmented visualization system 10. Other sensors that may be separate from or incorporated with the rendering device include, the camera 12, a gyroscope for determining the positional angle of the camera and display, a compass, an accelerometer, a barometric pressure sensor or other altimeter, a gravimeter for determining the downward direction and magnitude, a G.P.S. receiver for determining anchoring location, a depth camera to determine dynamic elevation, such as with SLAM, and other conceivable sensors that may be incorporated with the augmented visualization system 10. In addition to the geospatial data 20, the data input to the controller 18 may also include media data inputs 36, such as advertisements, news, and social media information and updates that may be provided an incorporated into the information displayed as part of the composite image on the display 16 or otherwise accessible by interacting with the displayed geospatial data 20.

With respect to the various potential outputs to the augmented visualization system 10, as also shown in FIG. 2, the controller 18 may output data to the display 16, and may also output data to the geospatial data source and other potential output sources on the rendering device 30, such as a speaker, a vibration motor, or other conceivable outputs to provide notifications or alerts to the user. For example, the output may include data overlaid in 3D space on an AR wearables viewport, data overlaid in 3D space on a camera type visual on a table/mobile device screen, data overlaid over the camera view from a drone, and a user interface allowing interaction and administration of the AR view.

In addition, the hardware that operates the augmented visualization system 10 may be packaged and embodied at least partially as a mobile device, such as phones and tablets, AR wearables, such as watches, goggles, and the like, which typically utilize a standard operating system (e.g., iOS, Android, Windows) and that has at least one of the device sensors to operate the system, or that can add them. Examples include: an Apple iPad Air 2, a Microsoft Surface Pro 3, and an Android Galaxy S5. The platform of the augmented visualization system 10 is a dynamic platform that allows recompilation to different hardware choices, including most AR wearables presently on the market.

Figure 3:
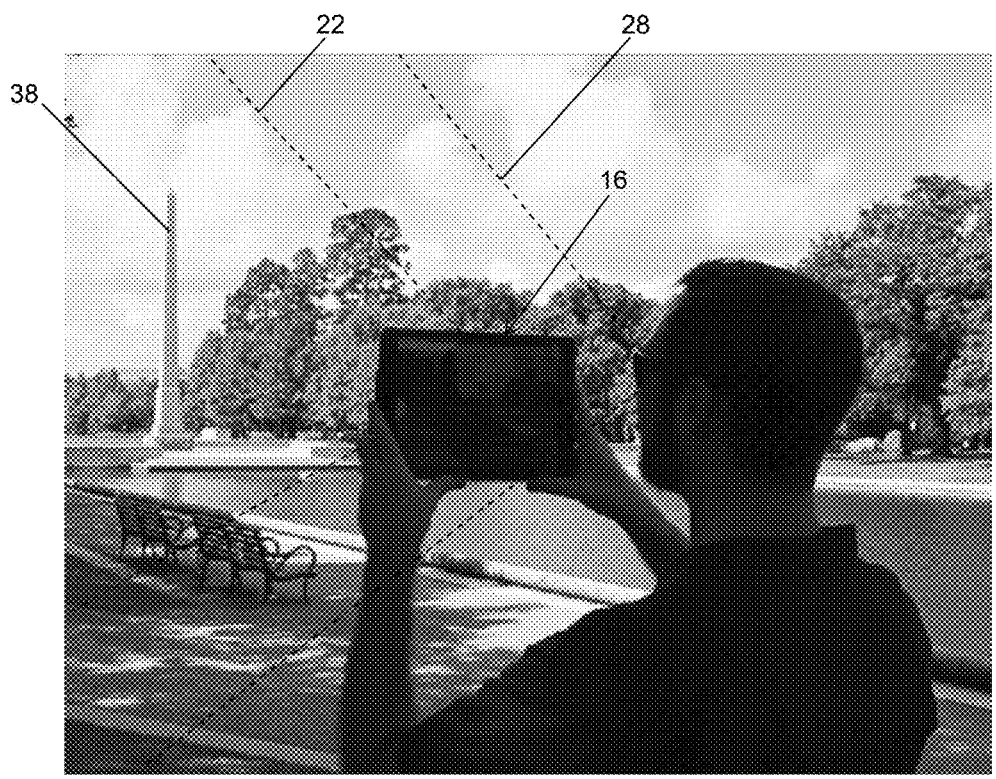
FIG. 3 is a perspective environmental view of a user holding a device that is operating an augmented visualization system, in accordance with the present invention.

Referring now to the exemplary illustrations of operation of the augmented visualization system 10 shown in FIGS. 3-9, a hand-held tablet computer is utilized as the rendering device 30, which includes the display 16 and the camera 12. As shown in FIG. 3, the camera's field of view 22 includes a portion of a user's vision field 28, such that, when the display 16 is positioned between the camera 12 and the user and/or the display 16 is generally in-line, near, or otherwise blended or integrated with the user's vision field 28, the user may easily associate the geospatial image 24 with the surrounding location. The controller 18 then processes the geospatial data 20 that is associated with the positional information (location, elevation, angle, directional position, etc.) of the camera 12, such that the geospatial data 20 tied to or otherwise located in the camera's field of view 22 is processed by the controller 18, and if relevant, displayed as a geospatial image. The geospatial image or images 24 generated by the controller 18 is displayed over or imbedded in the base image 26 that is captured by the camera 12 to provide a composite image or video to the user. It is understood that the image processing done by the controller may result in a substantially live video feed from camera overlaid with the geospatial image or images 24. Accordingly, it is contemplated, that the geospatial images may otherwise be generated in a substantially clear medium, such as a glass substrate, that similarly allows the user to view three-dimensional geospatial images 24 that are geographically relevant to a user as part of the augmented reality system 10 of the present invention.

Figure 3A:
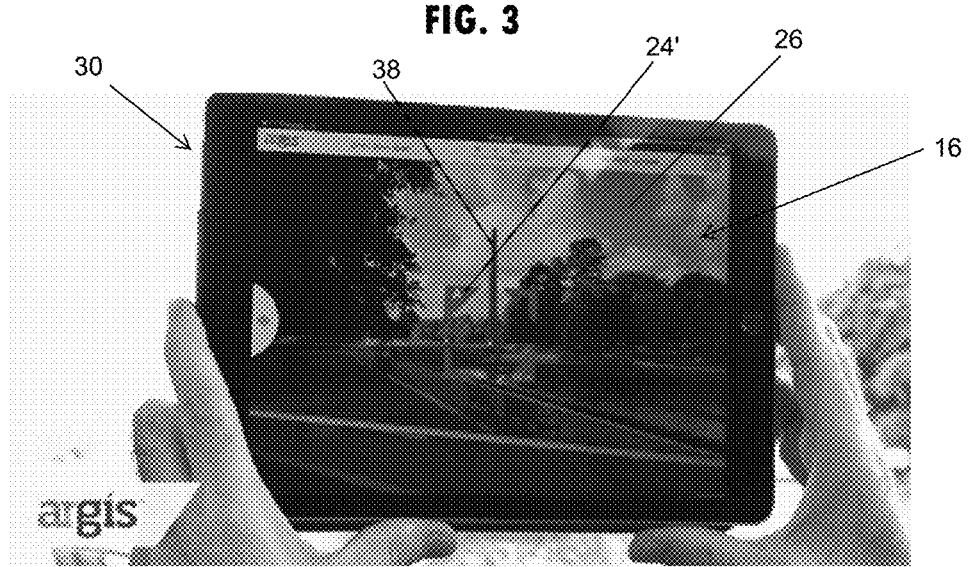
FIG. 3A is an enlarged view a display screen of the device shown in FIG. 3, displaying a geospatial icon over a monument shown in a base image taken from a camera of the device.
Figure 4:
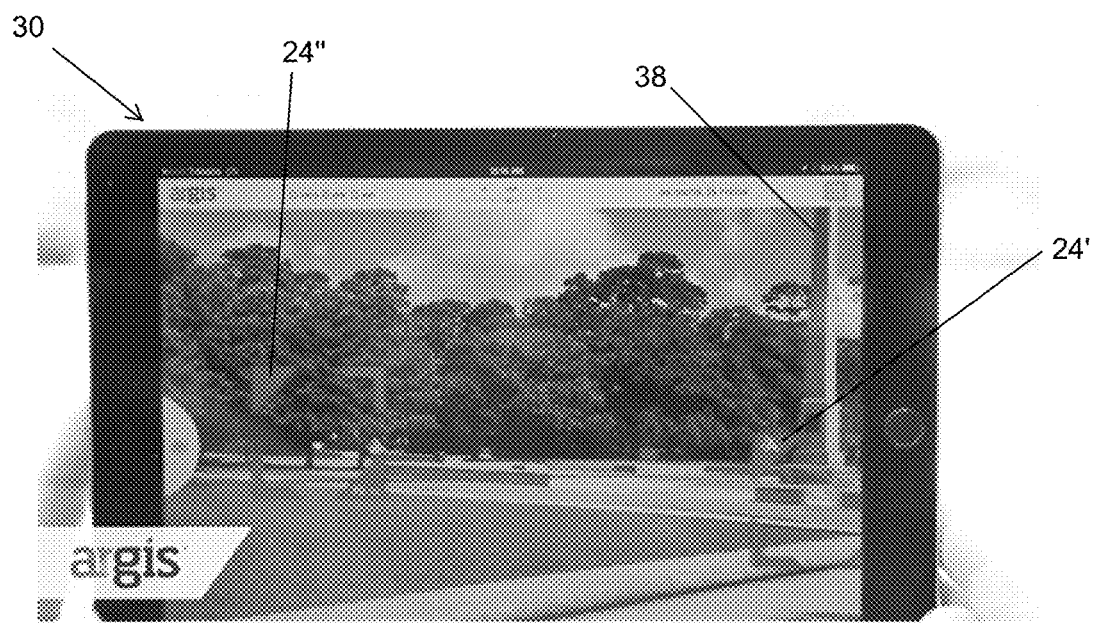
FIG. 4 is an elevational view of the display screen of the device, displaying two geospatial icons over the base image, with the user moved to a different location and directing the camera at view of the monument shown in FIG. 3.

As shown in FIGS. 3 and 3A, the camera's field of view 22 is capturing an image of a monument 38 and a geospatial icon 24' is generated on the display 16. More specifically, as shown in FIG. 3A, the geospatial icon 24' is overlaid on the base image 26 captured by the camera and centered at the base of the monument 38. When the user moves and walks to the other side of the monument 28, and thereby contemporaneously moves the rendering device 30 (including the camera and the display), the camera's location and positional information is changed. This change in positional information is continuously processed to provided live updates to the displayed image. As shown in FIG. 4, showing the display 16 when the user points the camera back at the monument 28 after walking to the other side thereof, the geospatial icon 24' is again overlaid on the base image 26 captured by the camera and centered at the base of the monument 38. Also, at the new location of the user shown in FIG. 4, an additional geospatial icon 24" is registered in the field of view 22 and is thereby displayed with the other geospatial icon 24' on the display.

The geospatial icons 24 and other images may be interacted with by a user, such as when the display includes a touch screen, as shown in FIG. 5, a touch event may be directed over the geospatial icon of the geospatial image to generate and display an informational element 25 over the composite image. The informational element 25 may have information corresponding to the associated geospatial data, such as data about the structure, feature, or item that is associated with geospatial data at that location (for example, the distance to that location, the description of the monument, past meter readings, etc.).

In one example, a field technician for a local water utility may be dispatched for a leak in a residential area. Without the augmented visualization system 10, it may be difficult to find the valve that has to be turned off before the technician can work on the leak, such as darkness, snow cover, or other barriers that may cover other otherwise hide a structure. With the augmented visualization system 10, a technician with little experience and lacking familiarity with a location, may use the rendering device 30 to locate the valve. Also, other people at remote locations may watch the video feed from the technician's camera, provide advice via the display 16, such as supplementing the technician's display with a repair manual or steps overlaid on the base image.

Other applications of the using the augmented visualization system 10 include viewing property lines, homes values and descriptions, sale information (FIG. 7); finding hidden underground assets (FIG. 8); visualizing a three-dimensional architectural rendering in the actual location before and during building (FIG. 9); visualizing a maintenance job before entering a possible hazardous situation; finding assets in an emergency where normal method of navigation are gone or destroyed; adding data to a drones visualization, assisting a tech through a workflow or complex job; identify specific equipment through computer vision and identify the correct repair procedures and materials needed; empower a pipeline to be inspected for environmental impacts while walking the pipeline for maintenance management; and the like. Unlike virtual reality, in which a simulated world is created, the augmented reality (AR) provided by the augmented visualization system 10 allows users to layer data or digital elements on top of a real-world, real-time view of the user's surroundings, such as statistics like square footage of a building, traffic patterns for a neighborhood, or hidden elements, like buried cable lines, obstructed fire hydrants, and the like, in the native environment.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature; may be achieved with the two components (electrical or mechanical) and any additional intermediate members being integrally formed as a single unitary body with one another or with the two components; and may be permanent in nature or may be removable or releasable in nature, unless otherwise stated.

It will also be understood that any described processes or steps within described processes may be combined with other disclosed processes or steps to form structures within the scope of the present invention. The exemplary structures and processes disclosed herein are for illustrative purposes and are not to be construed as limiting.

Changes and modifications in the specifically described embodiments may be carried out without departing from the principles of the present invention, which is intended to be limited only by the scope of the following claims, as interpreted according to the principles of patent law.

The invention claimed is:

1. An augmented visualization system comprising:
   a camera operable to capture a base image of a field of view;
   a spatial sensor configured to sense a position and directional view of the camera and to generate positional information corresponding to the sensed position and directional view of the camera;
   a data source having stored geospatial data, the stored geospatial data comprising a plurality of data points in three-dimensional space, the data points comprising a plurality of spatial data points defining a surrounding three-dimensional area around the sensed position of the camera and at least one object data point, wherein the at least one object data point is located within the surrounding three-dimensional area defined by the plurality of spatial data points;
   a controller in communication with the camera, the spatial sensor, and the data source, wherein the controller is configured to generate a three-dimensional model of the geospatial data around the sensed position of the camera based on the plurality of spatial data points, wherein the controller is configured to determine when the at least one object data point of the geospatial data in the three-dimensional model corresponds to a location in the field of view of the camera based on the sensed directional view of the camera, and wherein the controller is configured to generate a geospatial image in response to the controller determining that the location corresponding to the at least one object data point of the geospatial data is in the field of view, while also maintaining the three-dimensional model of the geospatial data around the sensed position of the camera in areas outside of the field of view;
   wherein the controller is configured to dynamically generate a composite image having the geospatial image overlaid with the base image, wherein the composite image overlays the geospatial image at a size and position relative to the base image based on a determined distance and elevation of the location of the at least one object data point of the geospatial image relative to the sensed position of the camera, wherein the controller processes the geospatial data associated with the positional information of the camera, such that the geospatial data both in the directional view of the camera and outside the directional view of the camera is dynamically processed by the controller, and if relevant, displayed in the composite image, and wherein the positional information comprises elevation; and
   a display in communication with the controller and operable to display a portion of the composite image.

2. The augmented visualization system of claim 1, wherein the display includes a touch screen that is configured to receive a touch event, and wherein, when the touch event is directed over an icon portion of the geospatial image, an informational element having information corresponding to the individual data point of the geospatial data associated with the geospatial image is displayed in the composite image.

3. The augmented visualization system of claim 1, wherein the field of view is configured to include at least a portion of a vision field of a user, and wherein the display is configured to be positioned between the camera and the user, such that the composite image is displayed generally in-line with the user's vision field.

4. The augmented visualization system of claim 1, wherein the geospatial image includes a hidden structure not visible in the base image.

5. The augmented visualization system of claim 4, wherein the hidden structure includes at least one of an underground utility line, a meter, and a tank.

6. The augmented visualization system of claim 1, wherein the spatial sensor includes at least one of a gyroscope, a compass, a GPS receiver, and an accelerometer on a mobile device that includes the camera.

7. The augmented visualization system of claim 1, wherein the data source is accessible via wireless communication of a mobile device that includes the camera and the spatial sensor.

8. An augmented visualization system comprising:
   a mobile device having (i) a camera operable to capture a base image of a field of view, (ii) a spatial sensor configured to sense a position and directional view of the camera and to generate positional information corresponding to the sensed position and directional view of the camera, and (iii) a display operable to display the base image;
   a data source having stored geospatial data comprising a plurality of data points in three dimensional space, the data points comprising a plurality of spatial data points defining a surrounding three-dimensional area around the sensed position of the camera and at least one object data point, wherein the at least one object data point is located within the surrounding three-dimensional area defined by the plurality of spatial data points; and
   a controller in communication with the mobile device and the data source, wherein the controller is configured to:
      generate a three-dimensional model of the geospatial data around the sensed position of the camera based on the plurality of spatial data points;
      determine when the at least one object data point of the geospatial data in the three-dimensional model corresponds to a location in the field of view of the camera based on the positional information of the camera ,while maintaining the three-dimensional model of the geospatial data around the sensed position of the camera in areas outside of the field of view;

dynamically generate a composite image of a geospatial image is overlaid with the base image, wherein the geospatial image is generated in response to the controller determining that the location corresponding to the at least one object data point of the geospatial data in the three-dimensional model corresponds to the field of view; and transmit the composite image to the display for displaying to a user of the mobile device;

wherein the composite image overlays the geospatial image at a size and position relative to the base image based on a determined distance and elevation of the geospatial image relative to the sensed position of the camera, wherein the controller processes the geospatial data associated with the positional information of the camera, such that the geospatial data in both the directional view of the camera and outside the directional view of the camera is dynamically processed by the controller, and if relevant, displayed in the composite image, and wherein the positional information comprises elevation.

9. The augmented visualization system of claim 8, wherein the display includes a touch screen that is configured to receive a touch event, and wherein, when the touch event is directed over the geospatial image, information corresponding to the associated geospatial data is displayed in the composite image.

10. The augmented visualization system of claim 8, wherein the field of view is configured to include at least a portion of a vision field of a user, and wherein the display is configured to be positioned between the camera and the user, such that the composite image is displayed in the direction of the user and generally in-line with the vision field of the user.

11. The augmented visualization system of claim 8, wherein the geospatial image includes a hidden structure not visible in the base image, and wherein the hidden structure includes at least one of an underground utility line, a meter, and a tank.

12. The augmented visualization system of claim 8, wherein the spatial sensor includes at least one of a gyroscope, a compass, a GPS receiver, and an accelerometer.

13. The augmented visualization system of claim 8, wherein the data source is accessible via wireless communication with the mobile device.

14. A method of operating an augmented visualization system, said method comprising:

capturing a base image of a field of view of a camera;

sensing a position and directional view of the camera with a spatial sensor and generating positional information corresponding to the sensed position and directional view of the camera;

accessing geospatial data stored in a data source, the geospatial data comprising a plurality of data points in three-dimensional space, the data points comprising a plurality of spatial data points defining a surrounding three-dimensional area around the sensed position of the camera and at least one object data point, wherein the at least one object data point is located within the surrounding three-dimensional area defined by the plurality of spatial data points;

generating a three-dimensional model of the geospatial data around the sensed position of the camera based on the plurality of spatial data points;

determining when the at least one object data point of the geospatial data corresponds to a location in the field of view of the camera based on the positional information;

dynamically generating a geospatial image in response to determining that the location corresponding to the at least one object data point of the geospatial data is in the field of the view, while maintaining the three-dimensional model of the geospatial data around the sensed position of the camera in areas outside of the field of view; and displaying a composite image in which the geospatial image is overlaid with the base image at a display in communication with the camera, wherein the composite image overlays the geospatial image at a size and position relative to the base image based on a determined distance and elevation of the location of the geospatial image relative to the sensed position of the camera, wherein the controller processes the geospatial data associated with the positional information of the camera, such that the geospatial data in both the directional view of the camera and outside the directional view of the camera is dynamically processed by the controller, and if relevant, displayed in the composite image, and wherein the positional information comprises elevation.

15. The method of claim 14, further comprising:

sensing a touch event at a touch screen of the display; and displaying an informational element in the composite image corresponding to the geospatial data, when the touch event is sensed over the geospatial image.

16. The method of claim 14, wherein the geospatial image includes a hidden structure not visible in the field of view.

* * * * *